US011845307B2

(12) United States Patent
Jo et al.

(10) Patent No.: US 11,845,307 B2
(45) Date of Patent: Dec. 19, 2023

(54) DEVICE AND METHOD FOR DETECTING ABNORMAL STATE OF TIRE

(71) Applicants: Hyundai Motor Company, Seoul (KR); Kia Corporation, Seoul (KR)

(72) Inventors: Sung Jin Jo, Seoul (KR); Jae Hoon Chung, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 31 days.

(21) Appl. No.: 17/702,363

(22) Filed: Mar. 23, 2022

(65) Prior Publication Data

US 2023/0063348 A1 Mar. 2, 2023

(30) Foreign Application Priority Data

Sep. 1, 2021 (KR) .......................... 10-2021-0116583

(51) Int. Cl.
  *B60C 23/06* (2006.01)
  *B60W 40/12* (2012.01)
  *B60C 23/04* (2006.01)

(52) U.S. Cl.
  CPC ........ *B60C 23/067* (2013.01); *B60C 23/0481* (2013.01); *B60W 40/12* (2013.01); *B60W 2422/70* (2013.01)

(58) Field of Classification Search
  CPC . B60C 23/067; B60C 23/068; B60C 23/0481; B60W 40/12; B60W 2422/70
  USPC ....................................................... 340/443
  See application file for complete search history.

(56) References Cited

U.S. PATENT DOCUMENTS

| 8,079,603 | B2 * | 12/2011 | Voigtlaender | B60G 17/019 |
| | | | | 280/5.514 |
| 10,137,744 | B2 * | 11/2018 | Heuermann | B60C 23/04 |
| 10,399,393 | B1 * | 9/2019 | Trotta | B60C 23/0452 |
| 10,543,721 | B2 * | 1/2020 | Choi | B60C 23/0435 |
| 10,875,539 | B2 * | 12/2020 | Steiner | B60C 23/0449 |
| 2003/0201881 | A1 * | 10/2003 | Headley | B60C 23/066 |
| | | | | 340/443 |
| 2006/0222120 | A1 * | 10/2006 | Yegin | B60C 23/0444 |
| | | | | 340/447 |
| 2008/0238644 | A1 * | 10/2008 | Voigtlaender | B60C 23/068 |
| | | | | 340/443 |
| 2015/0116103 | A1 * | 4/2015 | Yang | G08B 1/08 |
| | | | | 340/438 |
| 2017/0113745 | A1 * | 4/2017 | Cook | B62D 53/04 |
| 2021/0199791 | A1 * | 7/2021 | Podkamien | B60C 23/067 |

FOREIGN PATENT DOCUMENTS

| CN | 203450086 U | * | 2/2014 |
| CN | 106564467 A | * | 4/2017 |
| CN | 114889370 A | * | 8/2022 |

(Continued)

*Primary Examiner* — Eric Blount
(74) *Attorney, Agent, or Firm* — Fox Rothschild LLP

(57) ABSTRACT

A device for detecting an abnormal state of a tire includes a wireless transceiver spaced apart from the tire and coupled to a vehicle, where the wireless transceiver transmits a radio signal to a ground surface and acquires delay information required to receive a reflected wave from the ground surface, and a control module that calculates a reference distance between the wireless transceiver and the ground surface based on the delay information, and detects an abnormal state of the tire, based on a reference distance change.

18 Claims, 9 Drawing Sheets

(56) References Cited

FOREIGN PATENT DOCUMENTS

| DE | 102018218610 B4 | * | 12/2021 | ............ B60C 11/243 |
| EP | 1811275 A1 | * | 7/2007 | .............. G01G 19/08 |
| JP | 61167889 A | * | 7/1986 | ............ B60C 23/067 |
| KR | 2002017071 A | * | 3/2002 | |
| KR | 20130081095 A | * | 7/2013 | ............ B60C 23/067 |
| WO | WO-0103953 A2 | * | 1/2001 | .............. B60C 23/06 |
| WO | WO-2006137809 A1 | * | 12/2006 | |
| WO | WO-2015193903 A2 | * | 12/2015 | ............ B60C 11/246 |

* cited by examiner

DEVICE AND METHOD FOR DETECTING ABNORMAL STATE OF TIRE

CROSS-REFERENCE TO RELATED APPLICATION

This application claims under 35 U.S.C. § 119(a) the benefit of Korean Patent Application No. 10-2021-0116583, filed in the Korean Intellectual Property Office on Sep. 1, 2021, the entire contents of which are incorporated herein by reference.

BACKGROUND

(a) Technical Field

The present disclosure relates to a device and a method for detecting an abnormal state of a tire of a vehicle, more particularly, to the device and method for determining whether the tire is in a deflated state or is stolen.

(b) Description of the Related Art

Wheels of a vehicle may be easily removed using a simple tool when the vehicle is stopped. Therefore, a tire of the vehicle may be easily stolen. As the number of high-end vehicles increases and a proportion of expensive wheels and tires also increases, a frequency of tire theft incidents is increasing.

Many approaches for preventing tire theft have been proposed. However, conventional approaches for tire theft prevention require additional hardware, resulting in additional costs. Therefore, there is a need for a method to prevent theft of the tire without adding hardware of additional cost.

Further, there is a need for a method to prevent an abnormal state of the tire from occurring before the tire runs out of air or the tire is removed from the vehicle.

SUMMARY

An aspect of the present disclosure provides a device and a method for detecting an abnormal state of a tire to determine whether the tire is out of air or is stolen, in a state in which a user is not in a vehicle.

In particular, an aspect of the present disclosure is to provide a device and a method for detecting an abnormal state of a tire without resulting in additional cost.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for detecting an abnormal state of a tire includes a wireless transceiver spaced apart from the tire and coupled to a vehicle, wherein the wireless transceiver transmits a radio signal to a ground surface and acquires delay information required to receive a reflected wave from the ground surface, and a control module that calculates a reference distance between the wireless transceiver and the ground surface based on the delay information, and detects the abnormal state of the tire, based on a reference distance change.

In one embodiment of the present disclosure, the wireless transceiver is a UWB (Ultra Wide Band) antenna.

In one embodiment of the present disclosure, the control module may calculate an initial reference distance, based on identifying that a vehicle door is closed after an engine is turned off.

In one embodiment of the present disclosure, the control module may, after calculating the initial reference distance, calculate the reference distance on a predetermined time basis, and then calculate a difference between the initial reference distance and the calculated reference distance as the reference distance change.

In one embodiment of the present disclosure, the control module may determine that the tire is in a deflated state or the tire is being removed, based on a state in which the reference distance change is greater than or equal to a preset first threshold value and is smaller than a preset second threshold value.

In one embodiment of the present disclosure, the second threshold value may be equal to a sum of a tire thickness and a margin.

In one embodiment of the present disclosure, the control module may determine that the tire has been removed from the vehicle, based on a state in which the reference distance change is equal to or greater than the second threshold value.

In one embodiment of the present disclosure, the control module may determine whether the tire is abnormal, based on a change in a reference angle, wherein the reference angle is an angle between a reference line connecting the wireless transceiver and a rotation axis of the tire to each other and the ground surface in a side view of the vehicle.

In one embodiment of the present disclosure, the control module may determine a change in a ratio between the reference line and a reference height as a change in a sine value of the reference angle, wherein the reference height is defined as a distance between the wireless transceiver and a reference parallel line parallel to the ground surface and passing through the rotation axis of the tire.

In one embodiment of the present disclosure, upon determination of the abnormality of the tire, the control module may transmit abnormality information to a user terminal, or notify the abnormality through an alarm transmitter.

According to an aspect of the present disclosure, a method for detecting an abnormal state of a tire using a control module mounted on a vehicle includes calculating a reference distance between a ground surface and a reference point on the vehicle spaced apart from the tire by a predetermined distance, monitoring a reference distance change, and determining that the tire is in the abnormal state, based on a state in which the reference distance change is equal to or greater than a preset first threshold value.

In one embodiment of the present disclosure, the calculating of the reference distance may include receiving delay information including a time duration for which a radio signal transmitted from an Ultra Wide Band (UWB) antenna is reflected from the ground surface and reaches the antenna, and calculating the reference distance based on the delay information.

In one embodiment of the present disclosure, the calculating of the reference distance may include identifying that an engine of the vehicle is turned off, identifying that a door of the vehicle is closed, when the engine of the vehicle has been turned off, and calculating an initial reference distance, when the door of the vehicle has been closed.

In one embodiment of the present disclosure, the monitoring of the reference distance change may include, after calculating the initial reference distance, calculating the reference distance on a predetermined time basis, and calculating a difference between the initial reference distance and the calculated reference distance as the reference distance change.

In one embodiment of the present disclosure, the predetermined time may be shorter than a time estimate taken to remove the tire.

In one embodiment of the present disclosure, the determining that the tire is in the abnormal state may include determining that the tire is in a deflated state or is being removed, based on a state in which the reference distance change is greater than or equal to the preset first threshold value and is smaller than a preset second threshold value.

In one embodiment of the present disclosure, the determining that the tire is in the abnormal state may include determining that the tire has been removed from the vehicle, based on a state in which the reference distance change is equal to or greater than the second threshold value.

In one embodiment of the present disclosure, the monitoring of the reference distance change further may include determining a change in a sine value of a reference angle based on the reference distance, wherein the reference angle is an angle between a reference line connecting the reference point and a rotation axis of the tire to each other and the ground surface in a side view of the vehicle.

In one embodiment of the present disclosure, the determining of the change in the sine value may include determining a change in a ratio between the reference line and a reference height as the change in the sine value, wherein the reference height is defined as a distance between the wireless transceiver and a reference parallel line parallel to the ground surface and passing through a rotation axis of the tire.

In one embodiment of the present disclosure, the method may further include, upon determination of the abnormality of the tire, transmitting abnormality information to a user terminal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
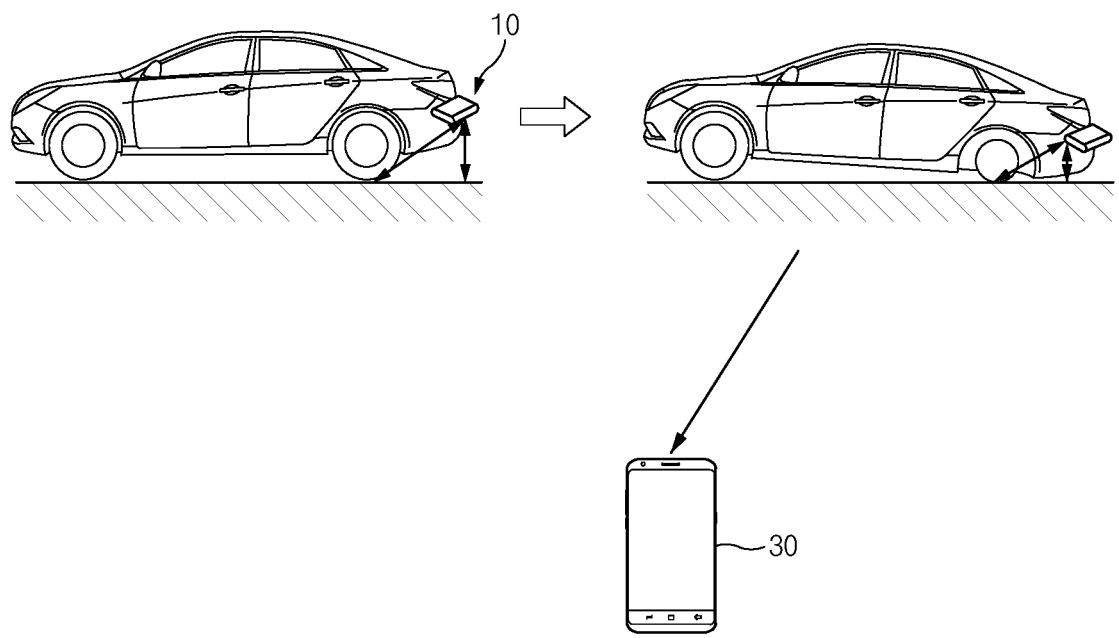
FIG. 1 is a diagram for illustrating tire state detection according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "uni", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing an embodiment of the present disclosure, a detailed description of the related known configuration or function will be omitted when it is determined that it interferes with the understanding of an embodiment of the present disclosure.

In describing the components of an embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIG. 1 to FIG. 8, embodiments of the present disclosure will be described in detail.

Figure 2:
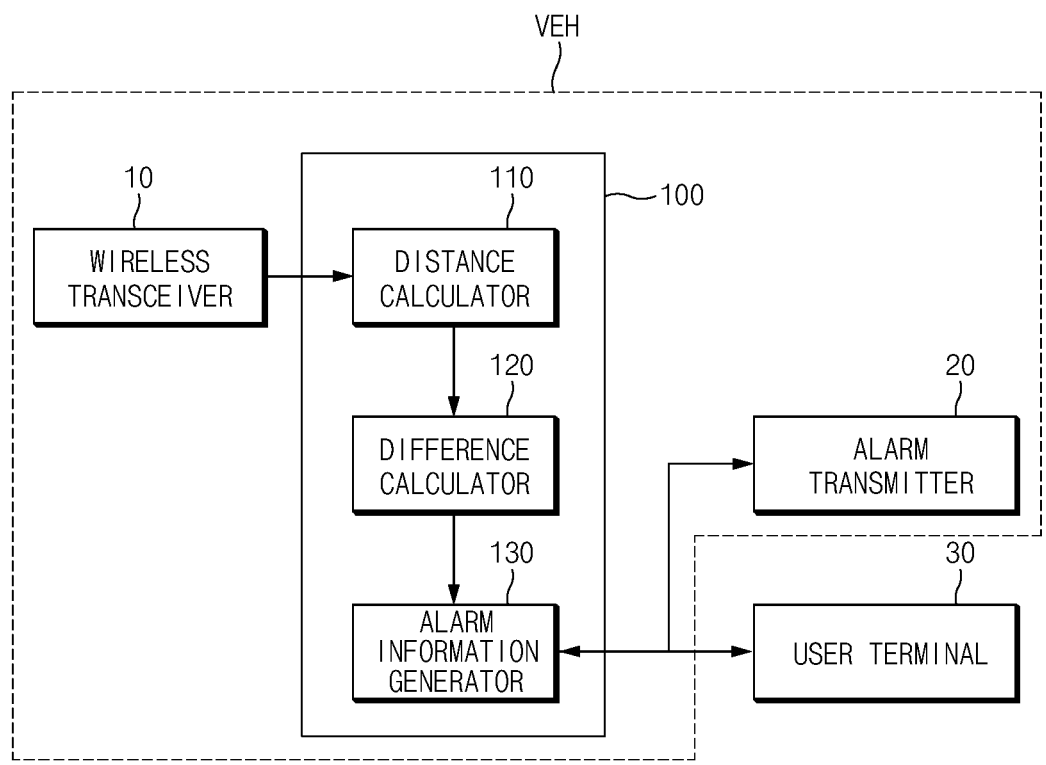
FIG. 2 is a block diagram showing a configuration of a tire state detection device according to an embodiment of the present disclosure.

FIG. 1 is a diagram for illustrating tire state detection according to an embodiment of the present disclosure, and FIG. 2 is a block diagram showing a configuration of a tire state detection device according to an embodiment of the present disclosure.

Referring to FIG. 1 and FIG. 2, a vehicle VEH including a tire state detection device according to an embodiment of the present disclosure monitors a ground surface and a change in a height of the vehicle thereon after parking and stops, and then determines an abnormal state of the tire, based on the monitoring result. The vehicle (VEH) may provide alarm information to a user terminal 30 based on identification of the abnormal state of the tire. The alarm information may include information capable of controlling a display or a speaker of the user terminal 30.

To this end, the tire state detection device according to an embodiment of the present disclosure may include a wireless transceiver 10, a control module 100 and an alarm transmitter 20.

The wireless transceiver 10 may be spaced apart from the tire and coupled to the vehicle, and transmit a wireless signal to the ground surface and may acquire delay information required to receive a reflected wave therefrom.

The wireless transceiver 10 may use an ultra-wideband (Ultra WideBand; hereinafter UWB) antenna. The UWB may be a short-range wireless communication protocol that operates using radio waves at high frequencies, and may exhibit very precise spatial recognition and directionality. Hereinafter, the wireless transceiver 10 will be referred to as the UWB antenna 10.

The control module 100 may calculate a reference distance between the UWB antenna 10 and the ground surface based on the delay information, and detect an abnormal state of the tire based on a reference distance change.

The alarm transmitter 20 may inform the abnormal state of the tire under control of the control module 100. The alarm transmitter 20 may be configured to transmit a warning sound to an outside of the vehicle.

Figure 3:
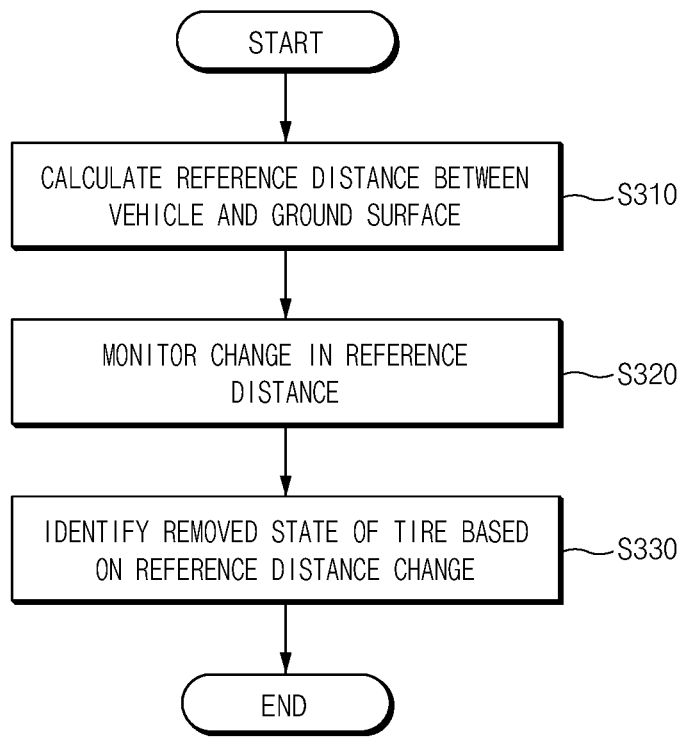
FIG. 3 is a flowchart showing a tire theft prevention warning method according to an embodiment of the present disclosure.

FIG. 3 is a flowchart showing a tire theft prevention warning method according to an embodiment of the present disclosure.

Referring to FIG. 3, the tire theft prevention warning method according to an embodiment of the present disclosure may include a first step S310 in which the control module 100 may calculate the reference distance.

The reference distance may be calculated after the parking or stopping of the vehicle has been confirmed. The control module 100 may determine that the vehicle is in a parked or stopped state, based on a state in which the vehicle's engine is turned off. Alternatively, the control module 100 may determine that the vehicle is in a parked or stopped state, based on a state in which the vehicle's engine is turned off and all of doors of the vehicle VEH are closed.

The reference distance may refer to a distance between an arbitrary point of the vehicle and the ground surface, and the reference angle may refer to an angle between a reference line and the ground surface. A detailed description thereof is as follows.

Figure 4:
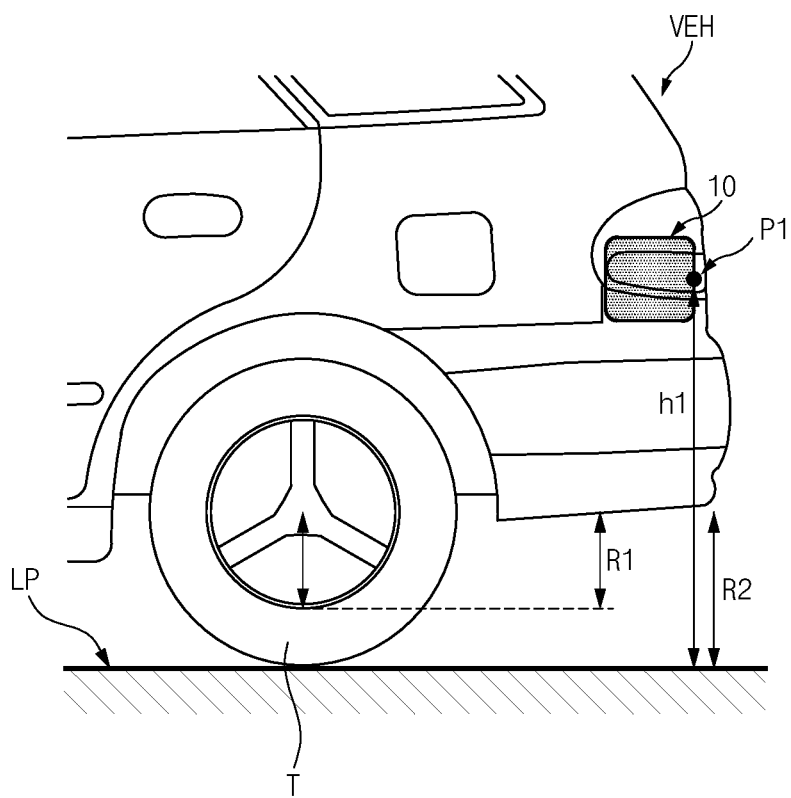
FIG. 4 is a diagram for illustrating a reference distance.

FIG. 4 is a diagram for illustrating the reference distance.

Referring to FIG. 4, a reference distance h1 means a distance between a ground surface LP and a preset reference point P1. The ground surface LP may refer to a bottom surface of an area where the vehicle is parked or stopped, or may be a bottom surface of a road or a parking lot or a bottom surface of an unpaved area. The reference point P1 may be any one point of the UWB antenna 10 coupled to the vehicle VEH. Accordingly, the reference distance h1 may mean a distance between the UWB antenna 10 and the ground surface LP. The UWB antenna 10 may obtain delay information between a transmitted signal and a received signal, and the control module 100 may calculate a distance between the UWB antenna 10 and the ground surface based on the delay information.

Hereinafter, in the present disclosure, an initially measured reference distance h1 after identifying the parked or stopped state of the vehicle VEH will be referred to as an initial reference distance h1. That is, FIG. 4 shows the initial reference distance h1.

In a second step S320, the control module 100 may monitor a change of the reference distance.

In order to monitor the change of the reference distance, the control module 100 may calculate the reference distance on a predetermined time basis. The predetermined time may be preset, and may be set to be shorter than a time required to remove the tire.

In a third step S330, the control module 100 may identify a removed state of the tire based on the reference distance change.

When the air of the tire "T" is deflated, the reference distance h1 may be reduced. Alternatively, when the tire is lifted up to remove the tire 'T', the reference distance h1 may increase. Alternatively, when the tire 'T' is completely removed and thus a level of a top of the vehicle body is lowered, the reference distance h1 may be reduced. Thus, the control module 100 may determine whether the tire is in the removed state based on the change in the reference distance h1.

Figure 5:
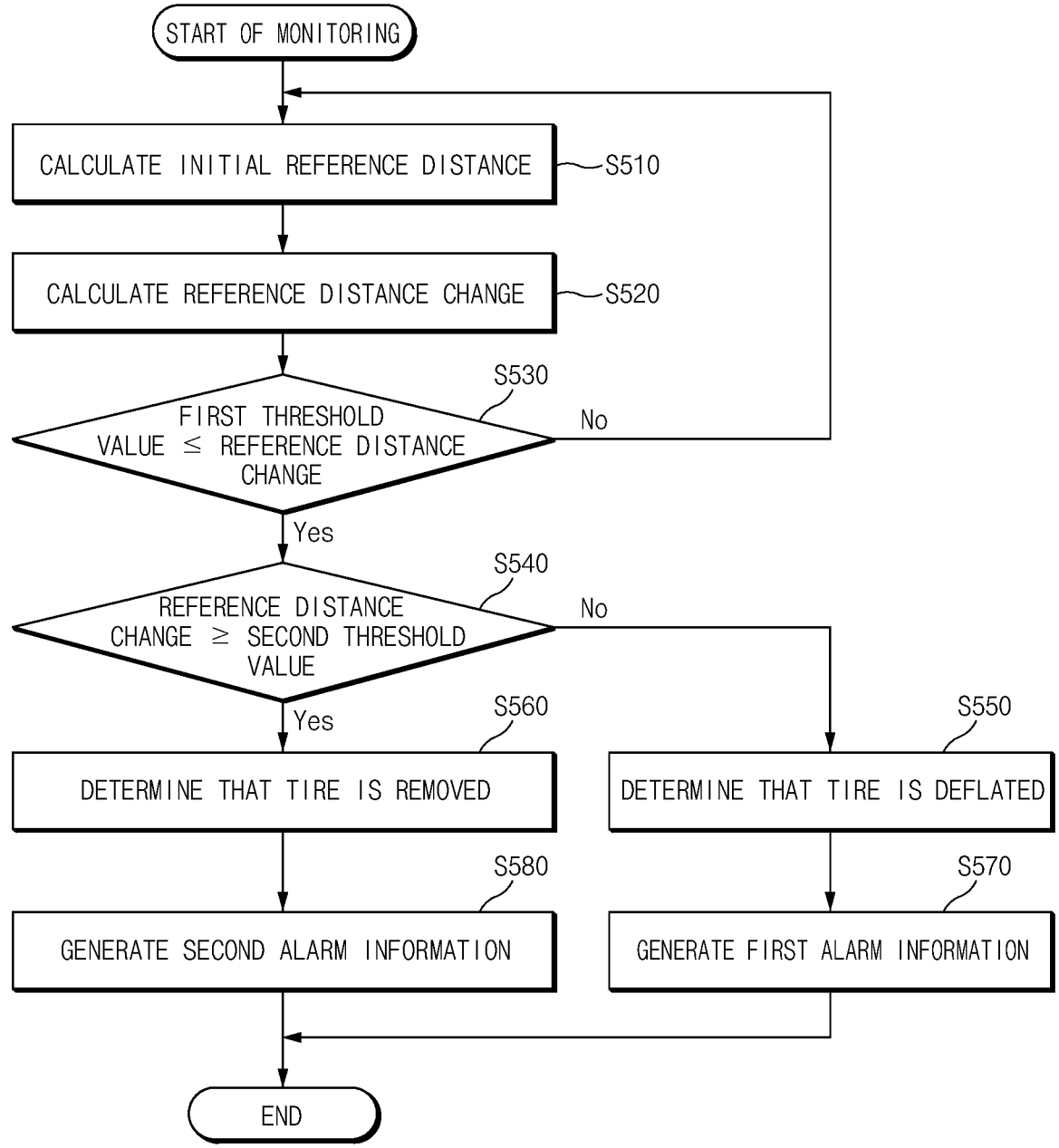
FIG. 5 is a flowchart for illustrating an embodiment of performing theft detection of a tire based on a reference distance change.

FIG. 5 is a flowchart for illustrating an embodiment of performing theft detection of a tire based on a reference distance change.

Referring to FIG. 5, in a first step S510 of the method for performing theft detection based on the reference distance change, the control module 100 may calculate the initial reference distance h1. The initial reference distance h1 may mean a reference distance initially calculated after identifying the parked or stopped state of the vehicle.

In a second step S520, the control module 100 may calculate the reference distance change.

The control module 100 may receive the delay information from the UWB antenna 10 on a predetermined time basis, and calculate the reference distance. Hereinafter, a reference distance to be calculated at any point for a monitoring period after the initial reference distance h1 has been obtained will be referred to as a reference distance h2.

Then, the control module 100 may calculate an absolute value of a difference between the initial reference distance h1 and the reference distance h2 as the reference distance change (|h1−h2|). That is, the control module 100 may calculate a cumulative value of the change in the initial reference distance h1 as the reference distance change. Further, the control module 100 may identify the absolute value of the difference between the initial reference distance h1 and the reference distance h2 and then identify a state in which the vehicle is lifted up in order to remove the tire.

In a third step S530, the control module 100 may determine that an abnormality has occurred in the tire when the reference distance change is equal to or greater than a first threshold value.

The first threshold value may be set to a value close to 0 (zero). The first threshold value acts as a criterion for primarily determining whether or not the tire is abnormal. Thus, when the first threshold value is 0, an alarm may be frequently sent to the user. Accordingly, the first threshold value may be set to be larger than a value at which a change in a tire thickness is negligible. For example, the first threshold value may be set to a value in a range greater than 0 and smaller than 2 millimeters (mm).

In a fourth step S540 and a fifth step S550, the control module 100 may determine that the tire is out of air or deflated, upon determination that the reference distance change is smaller than a second threshold value.

Figure 6:
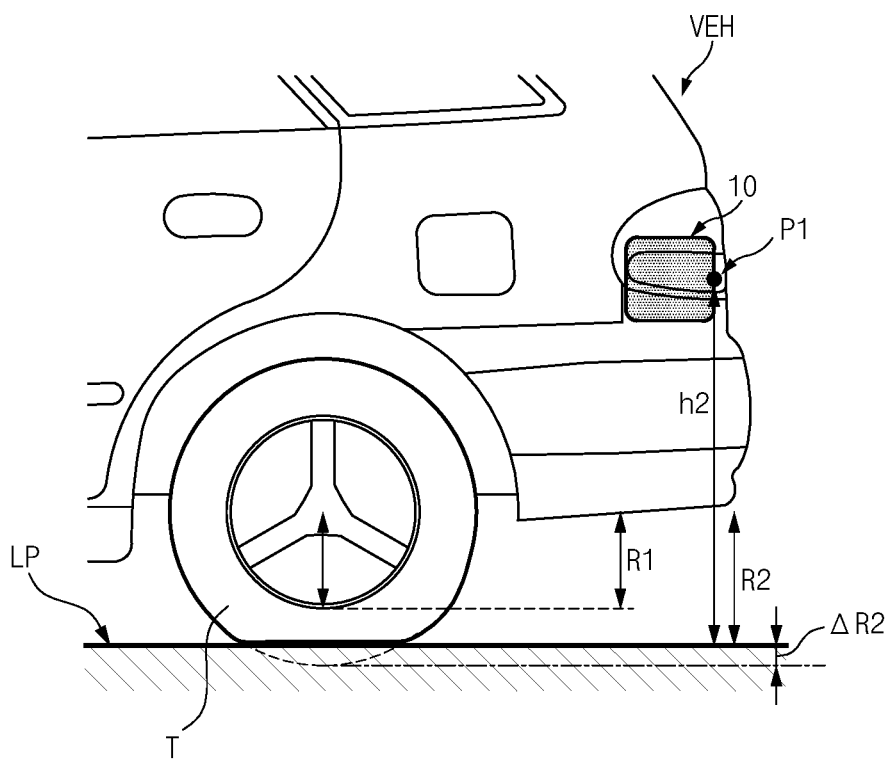
FIG. 6 is a diagram for illustrating that a control module determines a deflated state of the tire.

FIG. 6 is a diagram for illustrating that the control module determines the deflated state of the tire.

Referring to FIG. 6, when the tire thickness change ΔR occurs due to the deflation of the tire, the initial reference distance h1 as shown in FIG. 4 may be reduced by the tire thickness change (ΔR).

When the tire 'T' is deflated and thus the thickness of the tire is reduced, or the tire "T" is removed from the vehicle, the reference distance h2 may be smaller than the initial reference distance h1, so that the reference distance change may become larger than the first threshold value. However, when the tire 'T' is not completely removed, the reference distance change may be considered to be smaller than the thickness of the tire 'T'. Accordingly, the second threshold value may be set to a value close to the thickness of the tire "T", and for example, may be set to a value obtained by adding a margin to the thickness of the tire 'T'. The second threshold value may be set based on a reference distance change as pre-calculated in a state in which the tire is removed.

Then, the control module 100 may determine that the tire is out of air or deflated, based on a state in which the reference distance change is equal to or greater than the first threshold value and smaller than the second threshold value.

Further, when an attempt is made to remove the tire "T", the reference distance change may be greater than the first threshold value because the tire "T" is raised up. Considering a vertical dimension by which the vehicle body is lifted up while the tire "T" is being removed, the reference distance change may be smaller than the second threshold value.

Accordingly, the control module 100 may determine that the tire 'T' is in the deflated state or that the tire "T" is being removed, based on a state in which the reference distance change is equal to or greater than the first threshold value and smaller than the second threshold value. Then, the control module 100 may notify the user of the abnormality of the tire 'T' as described based on FIG. 3.

In a sixth step S560, the control module 100 may determine that the tire is being removed or is in a fully removed state, based on a state in which the reference distance change is equal to or greater than the second threshold value.

When the tire is completely removed from the vehicle, the reference distance change may be greater than or equal to the thickness of the tire "T". Accordingly, the control module 100 may determine that the tire is completely removed based on a state in which the reference distance change is equal to or greater than the second threshold value.

In a seventh step S570 and an eighth step S580, the control module 100 may generate alarm information corresponding to the abnormality of the tire.

The control module 100 may generate first alarm information based on the deflated state of the tire. Alternatively, the control module 100 may generate second alarm information based on a result of determining the removed state of the tire. The removed state of the tire may mean a state in which it is determined that the tire is completely removed from the vehicle.

The first and second alarm information may include a control signal for controlling hardware in the vehicle VEH to inform the tire abnormality. For example, the alarm information may include a control signal for controlling the alarm transmitter 20 to transmit a warning sound through the alarm transmitter 20 such as a speaker mounted on the vehicle VEH.

Further, the first and second alarm information may include information capable of controlling a display area of the user terminal 30 or controlling the speaker of the user terminal 30. That is, the control module 100 may transmit the alarm information to the user terminal 30 so that the user terminal 30 may display the abnormal state of the tire on a display or output a warning sound through the speaker.

The step of calculating the reference distance change according to an embodiment of the present disclosure may include a step of calculating a change of the reference angle. Subsequently, the control module 100 may determine whether the tire is abnormal based on the change of the reference angle.

Figure 7A:
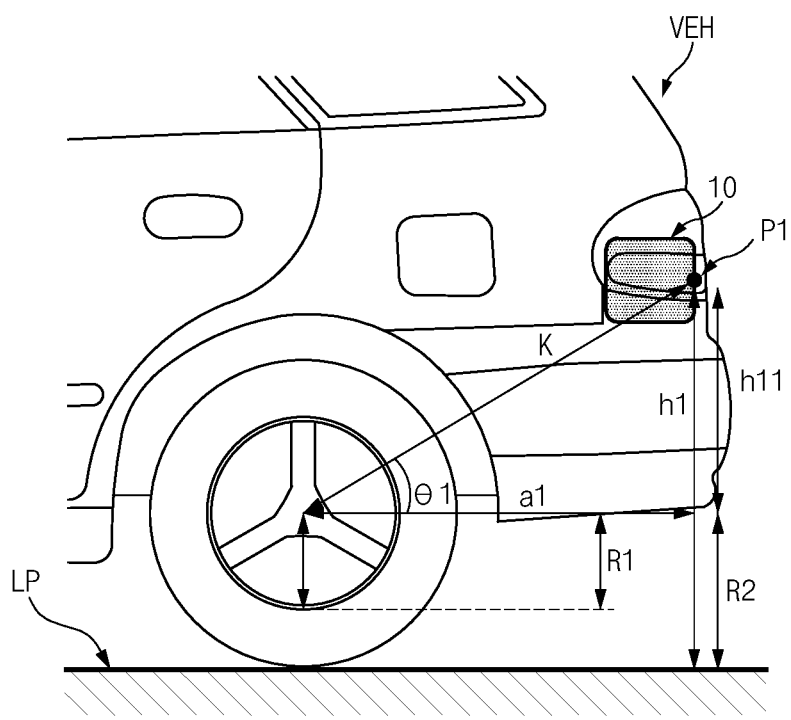
FIGS. 7A and 7B are diagrams for illustrating a method of detecting a tire state based on a change of a reference angle.
Figure 7B:
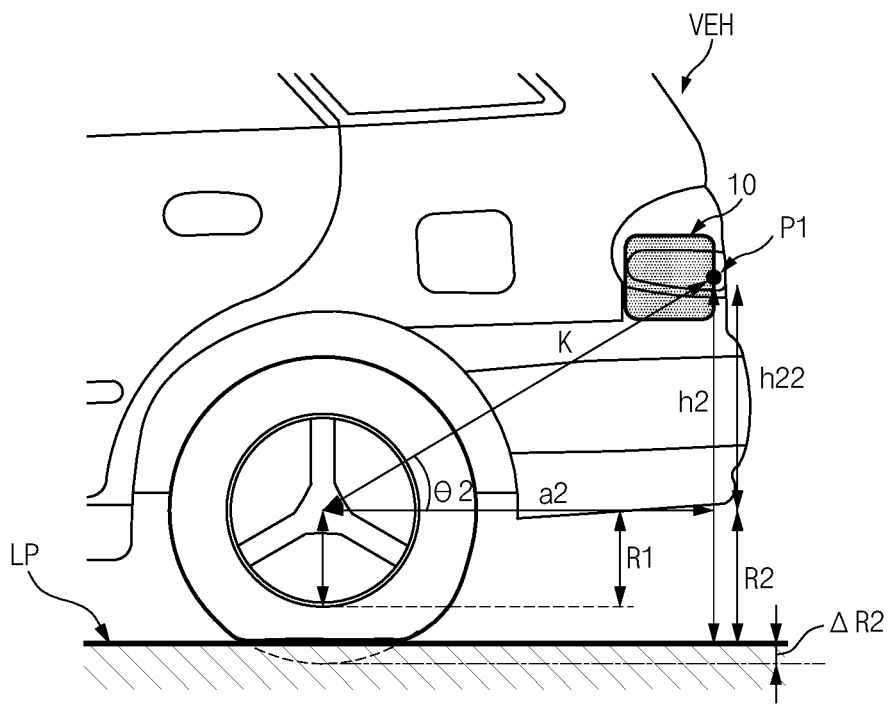

FIGS. 7A and 7B are diagrams for illustrating a method of detecting a tire state based on a change of a reference angle. FIG. 7A is a diagram showing that the tire is in a normal state, and FIG. 7B is a diagram showing that the tire is abnormal.

Hereinafter, an example in which numerical values herein are expressed based on a coordinate system of a plane when viewed toward a side of the vehicle will be described.

Referring to FIG. 7A, the reference angle θ1 may refer to an angle between a reference horizontal line a1 and the reference line k. Assuming that the ground surface LP is a perfect plane, the reference horizontal line a1 is a straight line parallel to the ground surface LP and passing through a center of rotation of the tire. Thus, the reference angle θ1 may refer to the angle between the reference line k and the ground surface LP which is assumed to be the perfect plane.

Because the control module 100 is configured to determine the change of the reference angle rather than a size of the reference angle θ1, the reference horizontal line a1 may be predetermined according to design specifications of the vehicle.

The reference line k may refer to a straight line connecting the reference point P1 of the UWB antenna 10 and a rotation axis of the tire to each other. The reference angle θ1 may be obtained using a 3D acceleration sensor or the like. However, the disclosure is not limited thereto. In order not to use additional hardware, the sensor may be replaced with a trigonometric function value of the reference angle θ1.

In order to calculate the change of the reference angle θ1, the change of the trigonometric function value of the reference angle θ1 may be calculated. The present disclosure will describe an embodiment for determining a change of a sine value of the reference angle θ1.

Referring to FIGS. 7A and 7B, when the tire is out of air or deflated or the tire is in a removed state, the reference angle may change due to inclination of a vehicle body. As the reference angle changes, the trigonometric function value of the reference angle may change.

Referring to FIG. 7A, a method of calculating the sine value sin θ1 of the initial reference angle θ1 is as follows. The sine value sin θ1 of the initial reference angle may correspond to a trigonometric function value obtained based on the identification of the parked or stopped state by the control module 100. As shown in the figure, the sine value $\sin\theta 1$ of the initial reference angle $\theta 1$ may be (h11/k). In this connection, h11 corresponds to the reference height, and may be obtained by calculating a difference (h1−R2) between the initial reference distance h1 and a tire radius R2.

Referring to FIG. 7B, the change of the sine value $\sin\theta 2$ according to the change of the reference angle may be (h22/k). In this connection, a change of the reference height h22 relative to the initial reference height h11 may be approximated to the reference distance change (h1−h2).

Therefore, when the reference angle changes from $\theta 1$ to $\theta 2$, the change of the sine value sin may be indicated as approximately |(h1−h2)/K|. As such, the control module 100 may determine the change in the sine value of the reference angle based on the difference between the reference distance h2 and the initial reference distance h1. Then, the control module may determine whether there is an abnormality in the tire, based on a preset first threshold angle and a second threshold angle.

Figure 8:
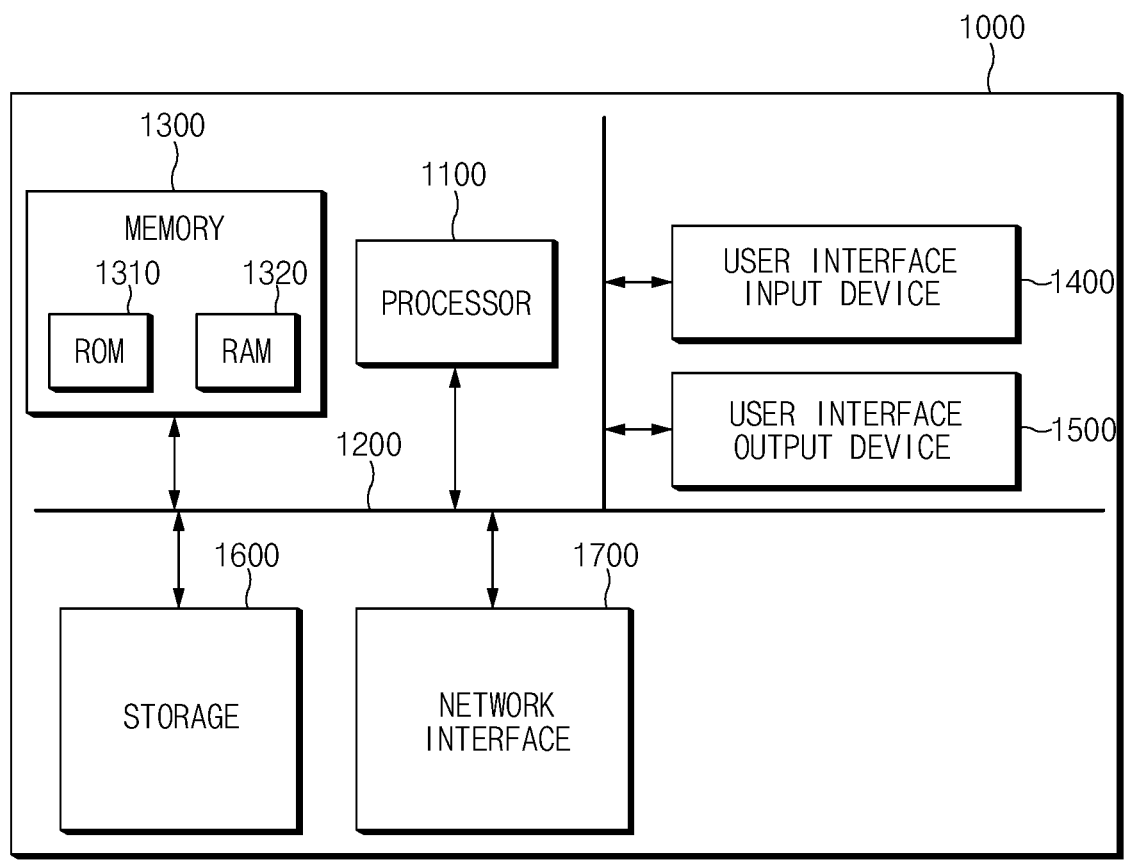
FIG. 8 is a diagram showing a computing system according to an embodiment of the present disclosure.

FIG. 8 is a diagram showing a computing system according to an embodiment of the present disclosure.

Referring to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The device and the method of the present disclosure may detect an abnormal state of a tire based on the identifying that an occupant is absent in the vehicle.

Further, the device and the method of the present disclosure may use the UWB (ultra-wideband) antenna attached to the vehicle and thus does not require additional hardware, and thus may detect an abnormal state of a tire at a low cost.

In addition, various effects directly or indirectly identified based on the disclosure may be provided.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for detecting an abnormal state of a tire, the device comprising:
   a wireless transceiver spaced apart from the tire and coupled to a vehicle, wherein the wireless transceiver transmits a radio signal to a ground surface and acquires delay information required to receive a reflected wave from the ground surface; and
   a control module configured to calculate a reference distance between the wireless transceiver and the ground surface based on the delay information, and detect the abnormal state of the tire, based on a reference distance change,
   wherein the control module is further configured to determine whether the tire is abnormal, based on a change in a reference angle,
   wherein the reference angle is an angle between a reference line connecting the wireless transceiver and a rotation axis of the tire to each other and the ground surface in a side view of the vehicle.

2. The device of claim 1, wherein the wireless transceiver is a UWB (Ultra Wide Band) antenna.

3. The device of claim 1, wherein the control module is configured to calculate an initial reference distance, based on identifying that a vehicle door is closed after an engine is turned off.

4. The device of claim 3, wherein the control module is configured to, after calculating the initial reference distance, calculate the reference distance on a predetermined time basis, and then calculate a difference between the initial reference distance and the calculated reference distance as the reference distance change.

5. The device of claim 4, wherein the control module is configured to determine that the tire is in a deflated state or the tire is being removed, based on a state in which the reference distance change is greater than or equal to a preset first threshold value and is smaller than a preset second threshold value.

6. The device of claim 5, wherein the second threshold value is calculated by summing a tire thickness and a margin.

7. The device of claim 5, wherein the control module is configured to determine that the tire has been removed from the vehicle, based on a state in which the reference distance change is equal to or greater than the second threshold value.

8. The device of claim 1, wherein the control module is configured to determine a change in a ratio between the reference line and a reference height as a change in a sine value of the reference angle,
   wherein the reference height is defined as a distance between the wireless transceiver and a reference parallel line parallel to the ground surface and passing through the rotation axis of the tire.

9. The device of claim 1, wherein upon determination of the abnormality of the tire, the control module is configured to transmit abnormality information to a user terminal, or notify the abnormality through an alarm transmitter.

10. A method for detecting an abnormal state of a tire using a control module mounted on a vehicle, the method comprising:
    calculating a reference distance between a ground surface and a reference point on the vehicle spaced apart from the tire by a predetermined distance;
    monitoring a reference distance change; and
    determining that the tire is in the abnormal state, based on a state in which the reference distance change is equal to or greater than a preset first threshold value,
    wherein monitoring the reference distance change further includes determining a change in a sine value of a reference angle based on the reference distance,
    wherein the reference angle is an angle between a reference line connecting the reference point and a rotation axis of the tire to each other and the ground surface in a side view of the vehicle.

11. The method of claim 10, wherein calculating the reference distance includes:
    receiving delay information including a time duration for which a radio signal transmitted from an wireless transceiver is reflected from the ground surface and reaches the antenna; and
    calculating the reference distance based on the delay information.

12. The method of claim 10, wherein calculating the reference distance includes:
    identifying that an engine of the vehicle is turned off;
    identifying that a door of the vehicle is closed, when the engine of the vehicle has been turned off; and
    calculating an initial reference distance, when the door of the vehicle has been closed.

13. The method of claim 12, wherein monitoring the reference distance change includes:
    after calculating the initial reference distance, calculating the reference distance on a predetermined time basis; and
    calculating a difference between the initial reference distance and the calculated reference distance as the reference distance change.

14. The method of claim 13, wherein the predetermined time is shorter than a time estimate taken to remove the tire.

15. The method of claim 13, wherein determining that the tire is in the abnormal state includes determining that the tire is in a deflated state or is being removed, based on a state in which the reference distance change is greater than or equal to the preset first threshold value and is smaller than a preset second threshold value.

16. The method of claim 15, wherein determining that the tire is in the abnormal state includes determining that the tire has been removed from the vehicle, based on a state in which the reference distance change is equal to or greater than the second threshold value.

17. The method of claim 10, wherein determining the change in the sine value includes determining a change in a ratio between the reference line and a reference height as the change in the sine value,
    wherein the reference height is defined as a distance between the wireless transceiver and a reference parallel line parallel to the ground surface and passing through the rotation axis of the tire.

18. The method of claim 10, wherein the method further comprises, upon determination of the abnormal state of the tire, transmitting abnormality information to a user terminal.

* * * * *